United States Patent
Walthert et al.

(10) Patent No.: US 10,065,452 B2
(45) Date of Patent: Sep. 4, 2018

(54) BICYCLE COMPONENT COMPRISING AN ADAPTER UNIT AND ADAPTER UNIT

(71) Applicant: DT SWISS INC., Grand Junction, CO (US)

(72) Inventors: Martin Walthert, Aarberg (CH); Stefan Spahr, Lengnau (CH); Simon Haas, Riedholz (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 14/950,090

(22) Filed: Nov. 24, 2015

(65) Prior Publication Data
US 2016/0144661 A1 May 26, 2016

(30) Foreign Application Priority Data

Nov. 24, 2014 (DE) .................. 10 2014 117 145

(51) Int. Cl.
| | | |
|---|---|---|
| *B60B 27/02* | (2006.01) | |
| *B60B 27/00* | (2006.01) | |
| *B62K 25/02* | (2006.01) | |
| *B62K 19/38* | (2006.01) | |
| *B62K 19/34* | (2006.01) | |

(52) U.S. Cl.
CPC ........ *B60B 27/026* (2013.01); *B60B 27/0052* (2013.01); *B60B 27/0073* (2013.01); *B60B 27/023* (2013.01); *B62K 19/38* (2013.01); *B62K 25/02* (2013.01); *B60B 27/0005* (2013.01); *B60B 27/0015* (2013.01); *B60B 27/0078* (2013.01); *B60Y 2200/13* (2013.01); *B62K 19/34* (2013.01)

(58) Field of Classification Search
CPC ...... B62K 25/02; B62K 19/38; B60B 27/026; B60B 27/023; B60B 27/0052; B60B 27/0073
See application file for complete search history.

(56) References Cited

U.S. PATENT DOCUMENTS

| | | | |
|---|---|---|---|
| 7,059,686 B2 * | 6/2006 | Kanehisa | ............ B60B 27/0005 301/110.5 |
| 7,216,743 B2 * | 5/2007 | Takizawa | ................ B62L 1/005 188/26 |
| 7,562,755 B2 * | 7/2009 | Spahr | .................. B60B 27/0073 192/30 V |

(Continued)

FOREIGN PATENT DOCUMENTS

EP            1629998 B1      1/2006

OTHER PUBLICATIONS

European Office Action from corresponding European Patent Application No. 15196001.0, dated Nov. 21, 2017.

*Primary Examiner* — Kip T Kotter
(74) *Attorney, Agent, or Firm* — Greer, Burns & Crain, Ltd.

(57) ABSTRACT

A bicycle component includes a hub shell for a wheel of an at least partially muscle-powered bicycle, wherein the hub shell is rotatably supported by at least one bearing device. An adapter unit is disposed on one end of the hub shell. The adapter unit includes an inner stopper having an inner stop face for transferring a clamping force to the bearing device and an outer stopper with an outer stop face transmitting at least part of the clamping force. The adapter unit includes a first and a second stopper component transmitting the clamping force.

21 Claims, 4 Drawing Sheets

(56) References Cited

U.S. PATENT DOCUMENTS

| | | | |
|---|---|---|---|
| 7,562,941 B2* | 7/2009 | Kanehisa | B60B 27/0005 301/110.5 |
| 7,581,795 B1 | 9/2009 | Chen | |
| 8,113,529 B2* | 2/2012 | Spahr | B62K 25/02 280/276 |
| 8,696,213 B2 | 4/2014 | Spahr | |
| 8,783,790 B2* | 7/2014 | Achenbach | B62K 25/02 301/124.2 |
| 2004/0182654 A1* | 9/2004 | Chen | B60B 27/0005 188/17 |
| 2007/0194620 A1* | 8/2007 | Kanehisa | B60B 27/0005 301/110.5 |
| 2007/0241608 A1* | 10/2007 | Chen | B60B 1/041 301/105.1 |
| 2014/0015308 A1* | 1/2014 | Chen | B60B 27/023 301/110.5 |

* cited by examiner

BICYCLE COMPONENT COMPRISING AN ADAPTER UNIT AND ADAPTER UNIT

BACKGROUND

The present invention relates to a bicycle component having a hub shell for a wheel of an at least partially muscle-powered bicycle and to an adapter unit for a hub of an at least partially muscle-powered bicycle and a two-wheeled vehicle comprising a frame, a fork, and an at least partially muscle-powered drive. The bicycle component and the two-wheeled vehicle comprise at least one adapter unit for fixing the wheel of a two-wheeled vehicle to the dropouts.

In the prior art, a great variety of bicycles have been disclosed whose wheels are attached in a number of ways to the dropouts or the fork or the frame of the bicycle or the two-wheeled vehicle. For example quick releases are usually used where as a rule the hub of a wheel comprises a hollow hub axle through which a quick release is passed for fastening to allow fast demounting and re-mounting of the wheel as needed. Hubs for quick releases as a rule comprise a stationary axle whose axle stubs are pushed into the dropouts of the bicycle where they are fastened by means of the quick release. It has been shown that hubs having a large axle diameter provide for higher stability. For attaching these hubs whose stationary axes are larger in their inner diameter, adapter units are mounted onto the axle ends, the adapter units providing on their outside surface an axle stub having a smaller outer diameter so that these hub types can be received in conventional dropouts.

For a number of years, hubs for through axle systems have increasingly been employed, the through axle showing one threaded end which screws into an internal thread on the dropout of the fork or the frame. These through axles enable increased rigidity of the system.

All types of wheels of two-wheeled vehicles are increasingly used with disk brakes where the brake disk is non-rotatably connected with the hub shell. The "Centerlock" system by Shimano has emerged as a de facto standard where the outside surface of the hub shell is provided with a non-round disk accommodation to non-rotatably receive the brake disk. One end of the hub shell is provided with an internally threaded circumferential shoulder into which an attachment ring screws, a so-called Centerlock Lockring, to axially secure the brake disk. These standard brake disks and standard fixing rings show standard dimensions so that these brake disks can be mounted to hubs of different manufacturers.

The contact surface of the axle or the adapter unit with the dropout of a frame has been enlarged to increase the rigidity of the wheel accommodation. To allow attaching a fixing ring for example for a Centerlock brake disk to a preassembled hub, the maximum diameter of the adapter unit must therefore be smaller than the clear inner diameter of such a fixing ring. In the case of Centerlock brake disks, this means that the outer diameter of an adapter unit cannot be larger than slightly below 26 mm. If the outer diameter of the adapter unit were larger, then mounting the brake disk would involve to first demount the adapter unit, then mount the brake disk, attach the fixing ring and finally reattach the adapter unit. Such demounting and mounting steps are undesirable in series production since for one they cause work, and for another they considerably increase sources of error. If these hubs are incorrectly mounted then the bicycle manufacturers and possibly also of the hub manufacturers may have to face claims for damages due to product liability. Then the question arises whether the liable party is the bicycle manufacturer who first disassembles and then reassembles the hub for mounting the brake disk or else the hub manufacturer. Moreover, as was indicated, every additional step involves additional costs.

It is therefore the object of the present invention to provide a bicycle component with an adapter unit and a two-wheeled vehicle comprising such a bicycle component and an adapter unit which allow to overcome at least part of the drawbacks described above.

SUMMARY

This object is solved by a bicycle component according to the invention that comprises a hub shell for a wheel of an at least partially muscle-powered bicycle. The hub shell is rotatably supported by means of at least one bearing device. At least one of the hub shell ends is provided with an adapter unit. The adapter unit comprises an inner stopper having an inner stop face for transferring a clamping force to the bearing device and an outer stopper with an outer stop face transmitting at least part of the clamping force. The adapter unit consists of a first and at least one second stopper component transmitting the clamping force.

The bicycle component according to the invention has many advantages. A considerable advantage of the bicycle component according to the invention is that the stopper consists of at least two stopper components transmitting at least part of the clamping force. This allows to divide up the adapter unit in two separate parts, each transmitting force and for example having different outer dimensions. This allows to preassemble the bicycle component—such as in particular a hub—at the hub manufacturer's site. The bicycle manufacturer in turn can e.g. just remove the outer stopper component of the adapter unit for mounting a brake disk or the like. Or the bicycle manufacturer first mounts the brake disk and only thereafter mounts the outer stopper component. In both cases the hub interior is left undisturbed by mounting this disk brake. Mounting is faster and the risk of errors is reduced. At the same time configuring the outer dimensions of the adapter unit offers more flexibility than in the prior art.

The inner stopper is understood to mean the axially inwardly stopper, and the outer stopper is understood to mean the axially outwardly stopper. The outwardly stopper is configured to absorb at least part of the clamping force of a dropout or of a frame component. The bicycle component may be configured to receive a through axle or for attachment by means of a quick release. In all the cases it is preferred for the inner axial end or the inner stopper to enter into a first end of the hub shell. The outer stopper at the outwardly axial end preferably protrudes outwardly from the hub shell.

According to the invention, the adapter unit comprises the inner stopper with the inner stop face. The inner stop face is suitable to transmit the clamping force to the bearing device. This means that the inner stopper transmits the clamping force completely or partially indirectly, and/or completely or partially directly, to the bearing device. It is in particular possible to mount or dispose a force-transferring component between the bearing device and the inner stopper. This force-transferring component may be configured to transmit the clamping force completely or partially to the bearing device. In other and particularly preferred configurations the inner stopper immediately abuts the bearing device.

In a preferred specific embodiment the outer stopper has a larger stop face and/or a larger outer diameter than does the inner stopper. Owing to the bipartition of the adapter unit the stop faces of the outer stopper and the inner stopper can be decoupled from one another. This provides greater freedom of construction allowing a more rigid connection of the bicycle component with the frame or the fork of the bicycle.

Preferably the outer stopper has a larger outer diameter than a maximum outer diameter of the bearing device. In particular the outer stopper has an outer diameter that is larger than a maximum inner diameter of the hub shell. This configuration makes it clear that only a bipartite adapter unit according to the invention enables partial mounting of the adapter unit while the interior of the hub or the bicycle component remains completely assembled e.g. for mounting a brake disk.

In preferred configurations, the first stopper component is configured to comprise the inner stopper with the inner stop face and/or the second stopper component is configured to comprise the outer stopper with the outer stop face. It is possible that part of at least one stop face namely, the inner stop face and/or the outer stop face, is provided by the first stopper component and part thereof, by the second stopper component. This is possible for example if one of the two stopper components radially surrounds the other stopper component so that the inner or outer stoppers are formed by surfaces of the first and/or second stopper component at one or both ends of the adapter unit.

Particularly preferably at least one stopper (inner and/or outer stopper) is formed by only one of the two stopper components. Preferably the axially inwardly stopper is only and/or completely formed by the first stopper component. Preferably the axially outwardly stopper is only and/or completely formed by the second stopper component.

Particularly preferably, a brake disk accommodation and in particular a standard brake disk accommodation showing an outer contour that is in particular non-round is configured on at least one end of the hub shell. Preferably an internally threaded fixing accommodation is configured in an axial region of the brake disk accommodation on the hub shell. The fixing accommodation may for example be provided with a fixing ring for fixed attachment of a brake disk. In simple cases the fixing ring is provided with an external thread that screws into an internal thread of the fixing accommodation. Or else the fixing ring may be provided for attachment to the side of the hub shell by one or more separate screws or the like. At any rate the fixing ring fixes in the axial direction a brake disk accommodated on the brake disk accommodation while the non-round outer contour ensures a non-rotating accommodation on the hub shell. These configurations allow a simple and highly functional mounting of a brake disk.

The fixing ring may be provided for a standard brake disk. It is also possible that the fixing ring integrally comprises an adapter or that an additional adapter ring is provided by means of which other brake disks can be non-rotatably attached to the brake disk accommodation.

It is possible for the bicycle component to be supplied with a fixing ring and/or a brake disk. It is also possible to separately offer for sale such a fixing ring and/or adapter ring and optionally a brake disk as extra parts. These components may be acquired as accessories from the bicycle component manufacturer or else from other manufacturers.

Typical fixing rings at any rate decrease the clear inner diameter of the hub shell at the end where the fixing ring is or can be attached. The at least bipartite structure of the adapter unit decouples the dimensions of the adapter unit and its force-transmitting parts from the clear dimensions at the hub shell. This allows the achievement of particularly rigid connections.

In a preferred specific embodiment, a fixing ring is attached to a fixing accommodation for axially fixing a brake disk. This fixing ring may be a standard Centerlock Lockring or a fixing ring showing a similar or equivalent function.

Preferably, the outer diameter of the outwardly stopper is larger than a clear inner diameter of a fixing ring and in particular of a standard fixing ring.

In preferred configurations, the fixing ring is designed as a screw-in part, comprising at least one fixing member protruding outwardly for the axial fixation of a brake disk. The fixing member protruding outwardly may for example be configured as a circumferential flange or else it may comprise one or more fingers or the like protruding radially outwardly for fixing a brake disk in the axial direction. Preferably the screw-in part is externally threaded to screw into an internal thread of the hub shell.

Advantageously, the first stopper component is immediately supported on the bearing device. The first stopper component is in particular supported on an inner bearing ring of the bearing device. Or else it is possible for the first stopper component to immediately rest against the bearing device. For example, an intermediate disk or an intermediate ring or the like may be provided between the stopper component and the bearing device or the inner bearing ring of the bearing device.

In preferred specific embodiments, the second stopper component radially surrounds the first stopper component over at least an overlapping portion. The diameter difference between the two stopper components is preferably small to ensure precise guidance. A difference between the inner diameter of the surrounding stopper component and the outer diameter of the received stopper component is in particular less than $1/100$ of the inner diameter of the surrounding stopper component and preferably less than $1/250$. Particularly preferably, the difference between the inner diameter of the surrounding stopper component and the outer diameter of the accommodated stopper component is less than $1/500$, and in particular even less than $1/1000$ and preferably less than $1/2000$ or than $1/4000$ of the inner diameter of the surrounding stopper component.

It is possible and preferred for the first and second stopper components to have at least two stepped diameter portions in the overlapping portion. It is also possible for the first and second stopper components to overlap in two separate overlapping portions which overlapping portions may show the same diameter or else different diameters.

At least one friction member is preferably disposed between the first and the second stopper component. Such a friction member is in particular configured as a friction ring, rubber ring, or O-ring. A friction member such as an O-ring allows to accommodate the second stopper component on the first stopper component secure against loss. In these cases, it is also possible to remove the second stopper component from the first stopper component without a tool, for example by hand.

In a preferred specific embodiment, the friction member is disposed in a groove in the second stopper component. Then it is for example possible for the overlapping portion on the second stopper component to serve for defined accommodation and guidance of the first stopper component while the force in the overlapping portion is substantially discharged within the first stopper component.

It is also possible to dispose the friction member in a groove of the first stopper component. The groove may for example be disposed in a radially larger diameter portion of the first stopper component to provide adequate wall thicknesses along the force transfer path for the transfer of force.

In all the configurations and specific embodiments it is particularly preferred for the first stopper component to have a tubular portion. Moreover it is preferred to provide at least one radial flange in a region on the inner stopper in the first stopper component and/or the second stopper component. One single flange or a double flange or a multiple flange may be provided wherein a slight distance is provided by means of a circumferential groove between the two flanges of a double flange. A single or double flange or the like allows to achieve reliable sealing that reliably protects the hub interior from external influences.

In particular, a flange configured at least as a double flange provides reliable protection from dirt and moisture entering since a double flange in conjunction with the circumferential wall of the hub shell provides a small radial gap of 2 mm, 1 mm or less so that dirt and water remain outside the interior of the hub shell.

The radial flange is in particular provided on the first stopper component and disposed adjacent to the inner stopper though spaced apart thereof. A small distance from the inner stopper prevents frictional contact of the flange for example with the bearing or the bearing device.

In all of the configurations, a separate retaining ring preferably secures the first stopper component to the hub shell. The retaining ring is in particular configured as a separate component which can be pushed, pressed, or screwed, into the hub shell. It is also possible to provide the retaining ring with a friction member such as a friction ring or an O-ring to reliably fix the retaining ring in the hub shell.

The retaining ring in particular takes care that when the second stopper component with the outer stopper is pulled off, the first stopper component remains inside the hub shell as desired. This allows for example to mount the brake disk and attach the fixing ring before reattaching the second stopper component to the first stopper component from outside.

The retaining ring preferably comprises at least one flange protruding radially inwardly. It is also possible for the retaining ring to show a double flange or the like which protrudes radially inwardly from outside. The retaining ring may show a C- or U-shaped cross-section overall.

The radially inwardly protruding flange of the retaining ring together with the radial flange of the first stopper component preferably forms at least part of a sealing device for sealing the interior of the hub shell. It is possible to provide further sealing members. In simple configurations the sealing device is formed only by the flange on the retaining ring or by the radial flange on the first stopper component. It is also possible for the sealing device to comprise at least one flange on the retaining ring and at least one flange on the first stopper component which together form the sealing device.

Particularly preferably, the outer diameter of the outer stopper is at least 26 mm and preferably at least 27 mm and in particular 28 mm or more.

The bicycle component may be provided or configured to receive, and/or may comprise, a through axle and/or a flange-type axle. Attachment to a bicycle frame or the like may be provided by means of a quick release.

It is possible and preferred to configure front wheel hubs as the bicycle components according to the invention. It is also possible to design bicycle components configured as, or comprising, rear wheel hubs. Such a rear wheel hub preferably comprises a hub shell on which in particular spoke flanges are configured for the attachment of spokes. Preferably a disk brake accommodation is configured on, or attached to, the first end of the hub shell. The second end is preferably provided with a rotor for accommodating at least one sprocket or at least one sprocket cluster. The rotor is rotatably supported in particular by means of a pair of axially spaced apart bearing devices. Furthermore, a freewheel is preferably provided which is preferably configured as a toothed disk freewheel. The freewheel comprises in particular a pair of toothed disks which are biased from outside to the engagement position by way of one or two spring devices.

Such a bicycle component is again preferably provided with adapter units, at least one of which in turn consists of at least two stopper components. The first stopper component may comprise a single flange or a double flange. The first stopper component may be retained on an axle component by means of at least one friction member.

The other end of the hub may be provided with a fastening ring or a fastening unit for fastening a sprocket cluster and preferably a standard sprocket cluster. The fastening ring may e.g. screw into an internal thread on the outer end of the rotor. Then a reduced clear—i.e. accessible—inner diameter is also provided in this place. A bipartite adapter unit again provides a clearly enlarged outer stop face in this place also on the rotor side of the hub.

Then the outer diameter of the outer stop face may be provided larger than the remaining inner diameter of the fastening ring. The outer diameter may be provided larger than the inner diameter of the internal thread of the rotor for screwing in the fastening ring.

The adapter unit according to the invention for a hub of an at least partially muscle-powered bicycle comprises a first stopper component having an inner stopper and an inner stop face at least partially disposed thereat and a second stopper component having an outer stopper and an outer stop face at least partially disposed thereat. The first stopper component is substantially configured tubular. The second stopper component is again substantially configured tubular, showing an outwardly protruding flange. The outwardly protruding flange forms the outer stopper. The second stopper component and the first stopper component radially surround one another in portions or at least in one portion. The first stopper component and the second stopper component are held together secure against loss by means of a friction member. Such a friction member may be configured for example as an O-ring e.g. of an elastic material.

The adapter unit according to the invention also has many advantages since it provides flexibility in dimensions and configuration.

Preferably the first stopper component comprises at least one outwardly protruding flange. The flange on the first stopper component is preferably disposed adjacent to, and spaced apart from, the inner stopper. An axial distance of the flange from the inner stopper is preferably smaller than half the axial extension of the first stopper component. The distance is preferably smaller than 3 mm and in particular smaller than 1 mm.

Particularly preferably, an outwardly protruding double flange is formed on the first stopper component. The flange or double flange is dimensioned such that a narrow radial gap remains to the inner peripheral surface of the hub shell in the region of the flange or double flange. The radial gap is in particular narrower than 2 mm and preferably narrower than 1 mm.

The flange on the second stopper component in particular forms the outer stopper with the outer stop face.

Preferably, the first stopper component shows two diameter sections. The outer diameter of the outer stop face is particularly preferably larger than that of the flange on the first stopper component.

The outer stop face of the outer stopper is in particular preferably configured as a plane surface. The outer stop face may be shaped round or oval or otherwise. A shape deviating from a round shape is in particular preferred if the outer stopper is provided to be non-rotatably accommodated on a frame component of a two-wheeled vehicle.

The two-wheeled vehicle according to the invention comprises a frame and a fork and dropouts on the frame and the fork. The drive provided is at least partially muscle-powered. The two-wheeled vehicle comprises two wheels, a front wheel and a rear wheel, each of the wheels including a hub and an associated axle unit. At least one wheel comprises a brake disk which is axially fixed by means of a fixing ring screwed into the hub. The hubs are clamped into the dropouts by means of adapter units. At least one adapter unit consists of a first stopper component and at least one second stopper component transmitting at least part of the clamping force.

The two-wheeled vehicle according to the invention also has many advantages since it allows a rigid construction.

Preferably, the first stopper component comprises an inner stopper in the interior of a hub shell of the hub and the second stopper component comprises an outer stopper having an outer diameter that is larger than an inner diameter of the fixing ring. Further advantages and features of the present invention can be taken from the general description and the description of the exemplary embodiments.

In all embodiments the adapter unit is preferably a pre-mounted or pre-mountable component assembly.

BRIEF DESCRIPTION OF THE DRAWINGS

Further advantages and features of the present invention can be taken from the exemplary embodiments which will be discussed below with reference to the enclosed figures.

The figures show in.

DETAILED DESCRIPTION

Figure 1:
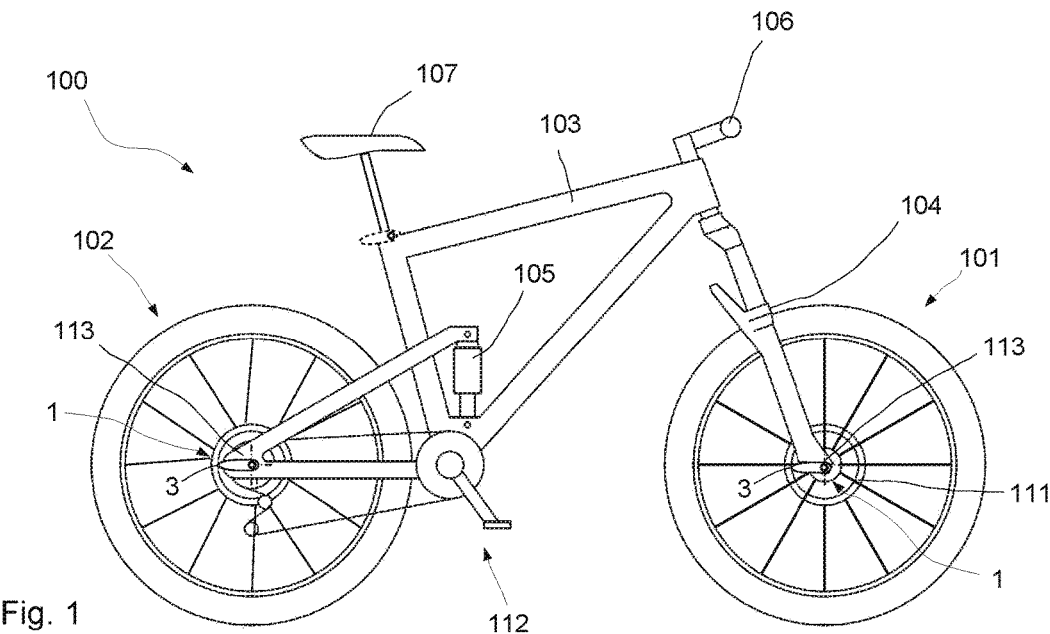
FIG. 1 a schematic side view of a mountain bike.

FIG. 1 shows a schematic illustration of a mountain bike as the bicycle or two-wheeled vehicle 100. The bicycle comprises a front wheel 101, a rear wheel 102, a frame 103, a suspension fork 104, a rear wheel damper 105, a handlebar 106, and a saddle 107. The drive 112 is provided by means of pedals and in this case, a chain shifting device respectively derailleur. The front wheel 101 and the rear wheel 102 are each fastened to dropouts 113 on the fork 104 or the frame 103.

Figure 2:
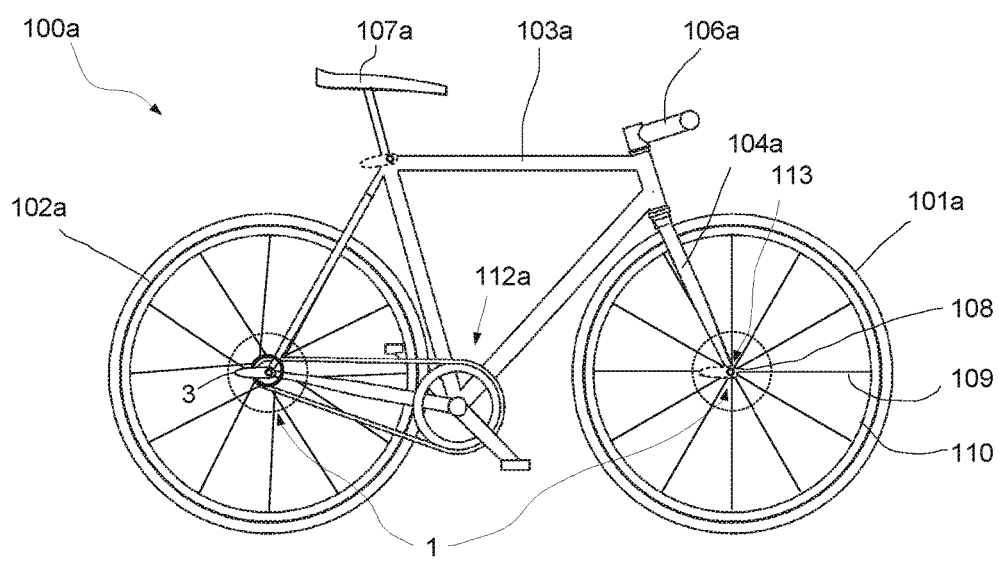
FIG. 2 a schematic side view of a racing bicycle or a roadster.

FIG. 2 shows a simplistic side view of a racing bicycle or roadster as the two-wheeled vehicle 100a, the bicycle having a front wheel 101a and a rear wheel 102a as the wheels, and a handlebar 106a, a saddle 107a, and a drive 112a provided by means of pedals. The wheels are fastened to the dropouts 113 on the fork 104a or the frame 103a. Both the front wheel and the rear wheel 101a, 102a comprise spokes 109 and a rim 110.

Both the two-wheeled vehicle according to FIG. 1 and the two-wheeled vehicle according to FIG. 2 each comprise a brake disk 111 at the wheels 101, 102.

Figure 3:
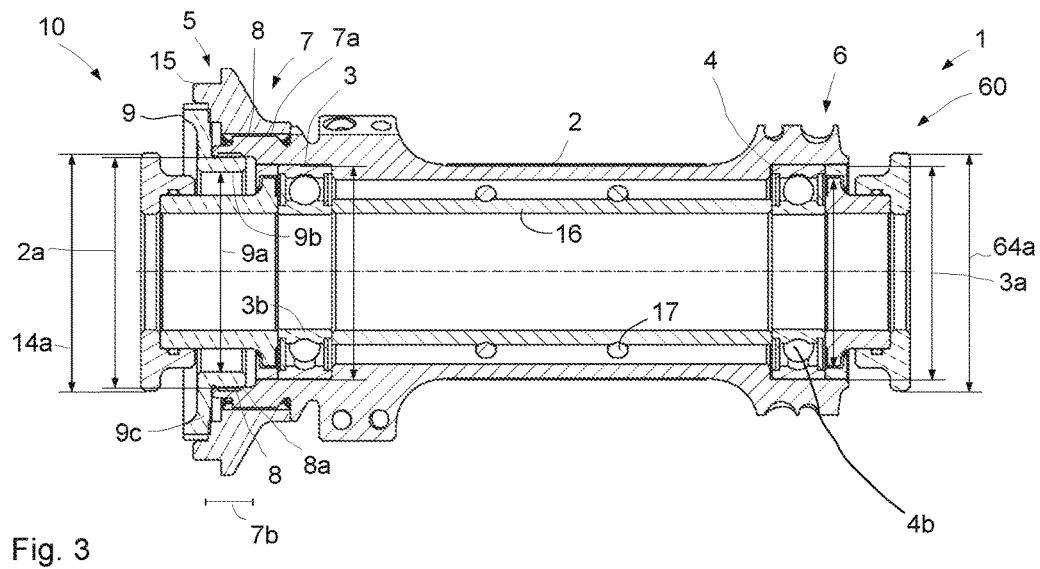
FIG. 3 a sectional side view of a bicycle component according to the invention.

FIG. 3 shows a schematic cross-section of a bicycle component 1 which is presently configured as a hub 108 and comprises a hub shell 2. The hub 108 is configured to receive a through axle as is exemplarily illustrated in FIG. 5.

The first end 5 of the hub shell 2 is provided with a brake disk accommodation 7 whose outer contour 7a is non-round. The brake disk accommodation 7 in this exemplary embodiment shows an attached adapter ring 15 by means of which different brake disks can be mounted. The adapter ring 15 is non-rotatably held by way of the non-round outer contour 7a of the hub shell 2. In the axial direction the adapter ring 15 is held to the hub shell by a suitable stopper and by a fixing ring 9 which with its external thread screws into an internal thread 8a in the fixing accommodation 8 of the hub shell.

Both the fixing ring 9 and the adapter ring 15 may, though they are not required to, be components of a solid hub 108.

It is also possible and preferred to attach immediately on the brake disk accommodation 7, a standard brake disk which is then fixedly received in the axial direction by a fixing ring 9. The brake disk accommodation 7 is in particular configured to receive a brake disk according to the "Centerlock" standard.

The hub shell receives a pair of bearing devices 3 and 4 to support the hub shell 2 to be rotatable relative to the through axle 91 which is intended to be inserted. The outer rings of the bearing devices 3 and 4 are fixed axially inwardly to suitable shoulders in the hub shell 2.

Between the inner bearing rings 3b and 4b of the bearing devices 3 and 4 a spacer 16 is disposed which is intended to keep the bearing devices 3 and 4 at defined distances from one another and which furthermore transfers the clamping force generated when the hub is clamped in. Prior to mounting the axle device 90, a radial movement of the spacer 16 is reduced to a small amount by way of the O-rings 17 on the spacer 16 so that the through axle 91 in FIG. 5 can be readily inserted into the interior of the bicycle component 1.

The first end 5 of the hub shell 2 is provided with an adapter unit 10 which is configured bipartite and comprises a first stopper component 20 and a second stopper component 30. The adapter unit 10 serves for transferring the clamping forces from the outer stopper 13 on the second stopper component 30 through the inner stopper 11 on the first stopper component, presently directly to the inner bearing ring 3b of the bearing device 3.

The clamping forces are then transmitted further from the inner bearing ring 3b through the spacer 16 to the inner bearing ring of the bearing device 4 from which they are transferred to the adapter unit 60. The adapter unit 60 in turn consists of two stopper components, a first stopper component 70 and a second stopper component 80 where in turn an inner stopper 62 and an outer stopper 63 are configured.

The clamping forces are transmitted from the adapter units 10 and 60 to the respective dropout 113 respectively received from said dropouts.

It is also possible to dispose a force transfer component 18 between an adapter unit 10, 60 and the pertaining bearing device 3 and 4. It is also possible to dispose a force transfer component 18 between the two adapter units 10, 60 and the pertaining bearing devices 3 and 4 as is shown in dotted lines in FIG. 4. Then the force is transferred indirectly from the adapter unit 10, 60 to the pertaining bearing device 3, 4. In particularly preferred configurations one force transfer component 18 only or no force transfer component 18 is provided.

A clear inner diameter 9a of the fixing ring 9 is plotted in FIG. 3. An annular flange as the fixing member 9c extends from the screw-in part 9b radially outwardly for fixing a brake disk or an adapter ring 15.

The clear inner diameter 9a of the fixing ring 9 is smaller than the outer diameter 3a of the bearing device 3 respectively 4. The largest inner diameter of the hub can be found in the axial region 7b in the internal thread 8a of the fixing accommodation 8.

The outer diameter 14a of the outer stop face 14 of the outer stopper 13 is larger than the maximum inner diameter 2a of the hub shell which presently equals the diameter of the internal thread 8a. The outer diameter 14a is thus larger than the clear inner diameter 9a of the fixing ring 9 and also larger than the outer diameter 3a of the bearing devices 3 and 4. This is possible because the adapter units 10 and 60 are configured bipartite wherein the first stopper component and the second stopper component are interconnected by a friction member such as an O-ring 31 which can be removed by hand.

This means that for exchanging or optionally for mounting a brake disk the second stopper component 30 is axially pulled off prior to attaching the brake disk and fixing it by way of a fixing ring 9. Thereafter the second adapter unit 30 can be readily pushed onto the first adapter unit 20. The hub does not require to be completely demounted.

Figure 4:
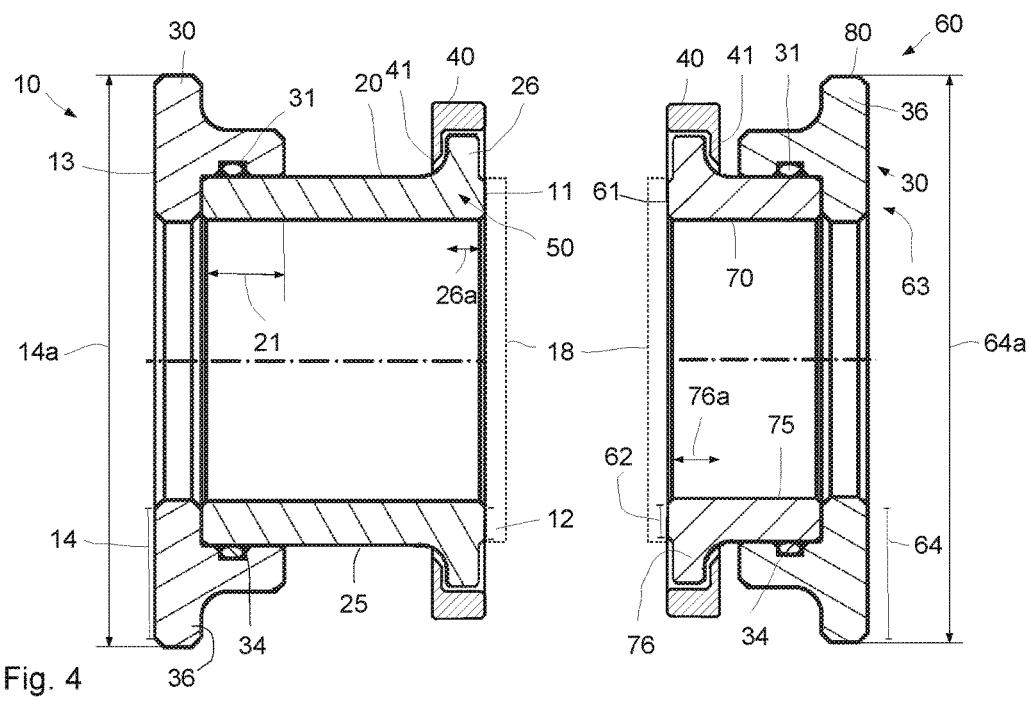
FIG. 4 enlarged sectional views of the adapter units of the bicycle component according to FIG. 3.

FIG. 4 shows enlarged illustrations of the adapter units 10 and 60. Both the adapter units 10 and 60 consist of one first stopper component 20 respectively 70 and one second stopper component 30 respectively 80 each. These second stopper components 30 and 80 are configured identically so that there are only three different parts in total.

On the inner stopper 11 of the first stopper component 20 a radial flange 26 is disposed extending radially outwardly somewhat spaced apart from the axially inwardly end of the first stopper component 20 so as to reliably avoid frictional contact with the bearing device 3 or 4 or other components. Otherwise the first stopper component substantially comprises a tubular portion 25.

The second stopper component 30 likewise comprises a tubular portion. The outer stop face 14 of the outer stopper 13 extends radially outwardly at the outwardly end of the second stopper component 30. On the whole an outwardly stop face 14 ensues which is presently annular, having an outer diameter 14a that is considerably larger than the outer diameter on the radial flange 26 of the first stopper component 20.

The first stopper component 20 and the second stopper component 30 overlap in an overlapping portion 21 in which a friction member 31 such as an O-ring is disposed. The O-ring is disposed in a groove 34 in the second stopper component 30.

The clamping force is transmitted from the outer stopper 13 through the front-face end of the tubular portion 25 through the first stopper component 20 to the inner stopper 11, from where the clamping forces are discharged through the inner bearing ring 3b and the spacer 16 to the inner bearing ring of the bearing device 4. From there the clamping forces are discharged through the other adapter unit 60 and finally into the dropout.

The enlarged illustration according to FIG. 4 shows the sealing device 50 which is presently formed by the retaining ring 40 and the radial flange 26 of the first stopper component 20. The retaining ring 40 is axially pushed from the outside into the hub shell 2, screwed in or held by friction forces.

The retaining ring 40 is provided with a radially inwardly extending flange 41 on the end facing the second stopper component 30. A narrow gap remains between the flanges 41 and 26 providing a sealing gap of the sealing device 50. The sealing gap is diverted a number of times such that the flanges 41 of the retaining ring 40 and the flange 26 of the first stopper component 20 virtually form a labyrinth seal.

The region 26a of the first flange 26 may be provided with a double flange which can further improve the sealing effect. Moreover, the weight of the first stopper component may optionally be somewhat reduced.

The adapter unit 60 is structured accordingly although its axial length is shorter. The adapter unit 60 is provided on the second end 6 of the hub shell 2 where no brake disk 7 is provided. The adapter unit 60 also comprises a first stopper component 70 and a second stopper component 80 which are identical in construction to the second stopper component 30 of the adapter unit 10. The two stopper components 70 and 80 are held together secure against loss by means of an O-ring 31. The first stopper component 70 of the adapter unit 60 as well as the first stopper component 20 of the adapter unit 10 is held in the interior of the hub shell 2 by the retaining ring 40. This is why, when the second stopper component 30, 80 is pulled off, the first stopper component 20, 70 is retained inside the hub shell 2.

The second stopper component 80 also comprises a tubular portion. At its outer end the second stopper component 80 comprises the outer stopper 63 with the stop face 64 protruding radially outwardly. The annular, outer stop face 64 having an outer diameter 64a is larger than the outer diameter of the radial flange 76 or optionally of a double flange of the first stopper component 70.

Figure 5:
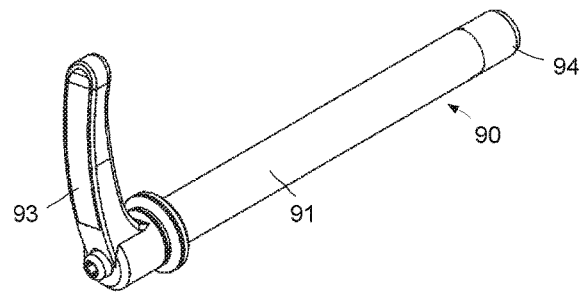
FIG. 5 a through axle for the bicycle component according to FIG. 3.

FIG. 5 shows a schematic illustration of an axle device 90 which is configured as a through axle 91 and at one end has a thread 94 and at the other end, a tensioning lever 93.

Figure 6:
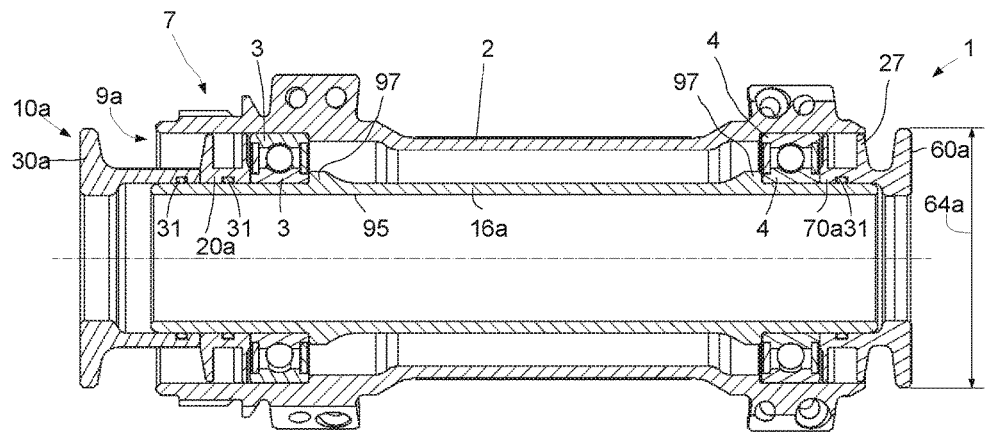
FIG. 6 another exemplary embodiment of a bicycle component in a sectional view.

FIG. 6 shows a variant of a bicycle component 1 which is similar in structure to the bicycle component according to FIG. 3. The bicycle component 1 according to FIG. 6 is likewise configured to receive a through axle 91. Unlike the configuration according to FIG. 3, the bearing devices 3 and 4 are mounted onto an axle part 95 which is provided with two radially outwardly protruding shoulders 97. The shoulders 97 form a spacer 16a.

The adapter unit 10a in turn consists of two stopper components 20a and 30a. Unlike the exemplary embodiment according to FIG. 3, the first stopper component 20a comprises a double flange 27 which allows to achieve a sufficient sealing effect. Furthermore, the first stopper components 20a are retained on the axle part 95 by friction members such as O-rings so the retaining rings 40 can be dispensed with. It is also possible to attach an additional retaining ring 40 to thus provide a total of three adjacent flanges as the sealing device 50.

The adapter unit 60a consists of one single component in which the stopper components 70a and 80 are incorporated.

The adapter unit is also provided with a double flange 27. The adapter unit 60a is again retained on the axle part 95 by means of a friction member 31 such as an O-ring.

Both of the adapter units 10a and 60a can be configured bipartite.

The further details are substantially identical with the exemplary embodiment according to FIG. 3.

Figure 7:
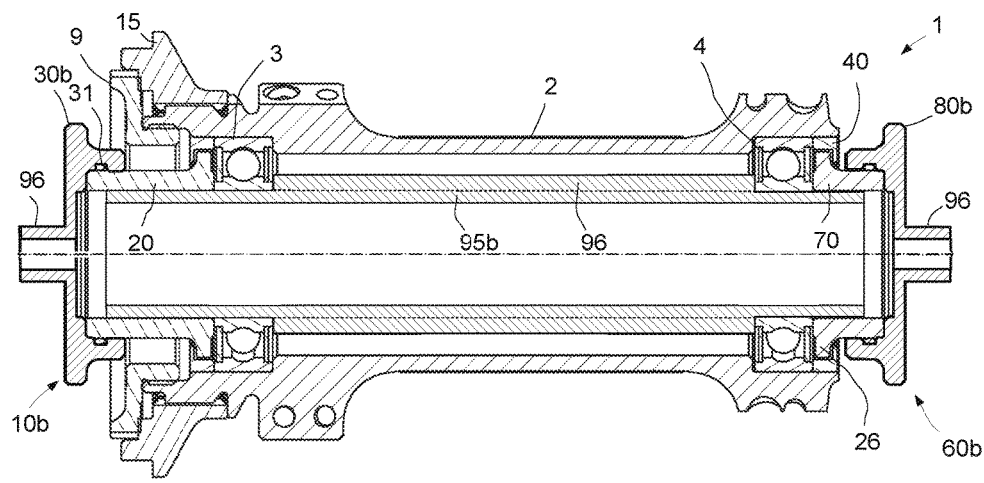
FIG. 7 yet another exemplary embodiment of a bicycle component illustrated in section.

FIG. 7 shows another embodiment variant provided to be used with a quick release. The adapter units 10b and 60b each comprise an axially outwardly axle stub 96 which serves to be inserted into a dropout of a bicycle frame or a fork. Thereafter, a quick release can be performed and the hub can be fixed to the frame by means of a quick release.

In this exemplary embodiment, an axle part 95b is provided which may extend over the entire length of the hub shell 2 and onto which the first stopper components 20 respectively 70 are pushed. It is possible to use O-rings for frictional connection with the axle part 95b. It is also possible to employ retaining rings 40 comprising a radially inwardly protruding flange 41, thus reliably retaining the first stopper components 20 and 70. The spacer 16 between the bearings 3 and 4 may be configured integrally with the axle part or as a separate part, as the dotted line indicates.

Figure 8:
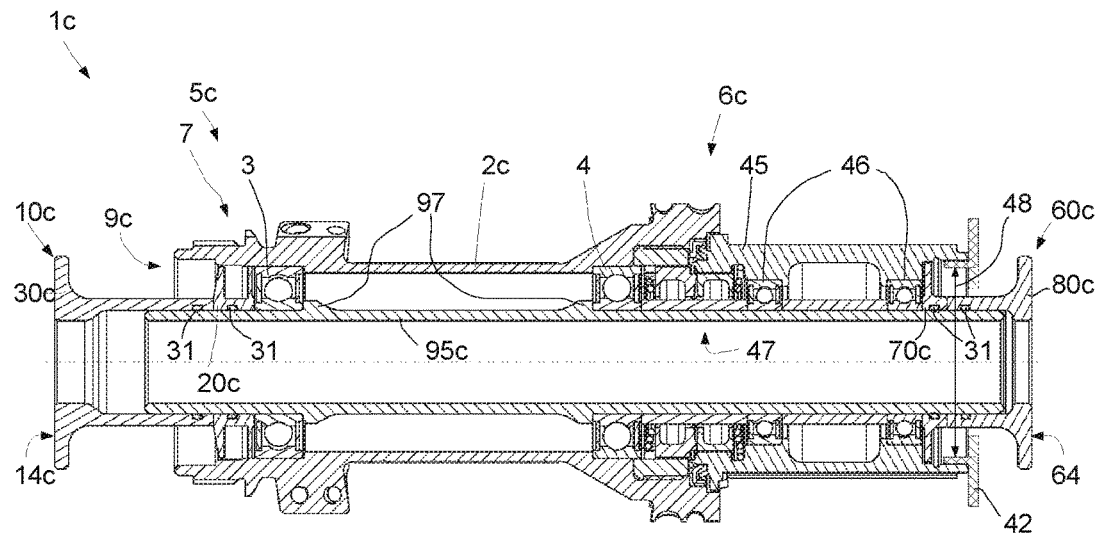
FIG. 8 another exemplary embodiment of a bicycle component illustrated in section.

FIG. 8 shows a variant of a bicycle component 1c configured as a rear wheel hub or comprising a rear wheel hub. The bicycle component 1c according to FIG. 8 shown in section basically comprises components similar or identical to the bicycle component 1c according to FIG. 6.

Although the bicycle component 1c according to FIG. 8 is configured to accommodate a through axle 91 (see FIG. 5), it may be provided with matched adapter units 10c and 60c to be employed with conventional quick releases. Accordingly, matched adapter units 10c and 60c may be equipped with axle stubs 96 in analogy to the adapter units according to FIG. 7 and optionally also comprise double flanges.

The rear wheel hub illustrated in FIG. 8 comprises a hub shell 2c with spoke flanges configured thereat or provided therefor for attaching spokes. A disk brake accommodation 7 is configured on, or attached to, the first end 5c of the hub shell 2c. The second end 6c is provided with the rotor 45 for receiving a sprocket cluster (not shown). The rotor 45 is rotatably supported on the axle part 95c by means of two axially spaced-apart bearings 46. A sleeve-like spacer is shown between the bearings 46. The sleeve-like spacer retains the inner bearing rings of the bearings 46 at a defined distance from one another, transmitting the axial forces. Furthermore, a freewheel 47 configured as a toothed disk freewheel is provided. The freewheel comprises a pair of toothed disks which are biased toward one another from the outside by means of one or two spring devices so that the axial toothings of the two toothed disks of the freewheel 47 mesh with one another in the normal state.

The axle part 95 comprises a pair of radially outwardly protruding shoulders 97 against which the inner bearing cups of the bearings 3 and 4 rest axially inwardly.

Figure 9:
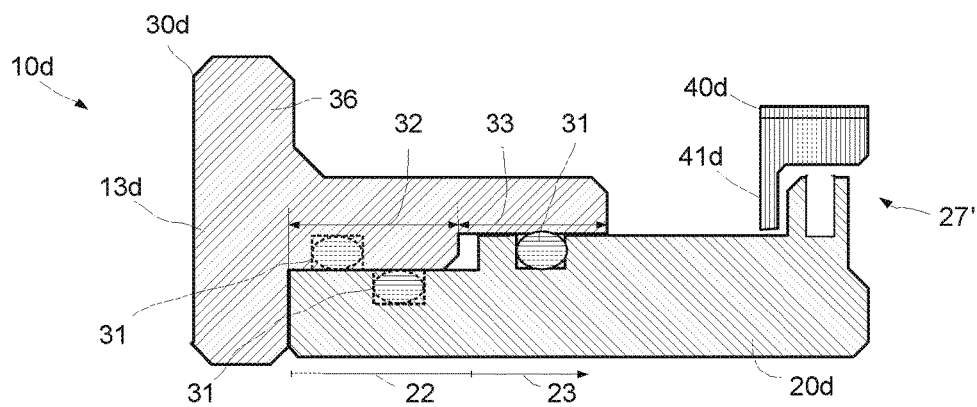
FIG. 9 an enlarged, schematic sectional view of another adapter unit.

The adapter units 10c and 60c of the bicycle component 1c illustrated in FIG. 8 in turn each consist of two stopper components. The first stopper components 20c and 70c may comprise a double flange 27' (FIG. 9) each so as to achieve a sufficient sealing effect. The first stopper components 20c and 70c are retained on the axle part 95c by friction members 31 such as O-rings so retaining rings 40d (as shown in FIG. 9) can be dispensed with.

The first stopper component 20c at the first end 5c is virtually only formed by the double flange 27' and the O-ring 31. Again it is possible to attach an additional retaining ring 40d (as shown in FIG. 9) to thus provide a total of three adjacent flanges as a sealing device 50.

The other end of the hub shows on the bottom right, a simplistic, cross-hatched fastening ring 42 which serves to fasten a (standard) sprocket cluster (not shown). The fastening ring 42 may e.g. screw into an internal thread at the outwardly end of the rotor. Then, the entire inner diameter of the rotor is again not available in this location. A bipartite adapter unit 60c with the stopper components 70c and 80c enables a clearly enlarged, outer stop face 64 also on the rotor side of the hub without requiring complete demounting of the adapter unit when mounting the rotor.

The outer diameter of the outer stop face 64 may be provided larger than the remaining inner diameter 48 of the fastening ring 42 and may be provided larger than the inner diameter of the internal thread of the rotor to screw in the fastening ring 42, as is shown in FIG. 8.

Optionally, the fastening ring 42 may comprise an inwardly protruding flange (indicated obliquely hatched) for still more sealing, if a mounting and demounting option of the fastening ring 42 is provided.

The further details are substantially identical with the exemplary embodiments according to FIG. 6 or FIG. 3.

FIG. 9 shows a schematic, enlarged cross-section of an adapter unit 10 in different embodiment variants. The first stopper component 20 comprises a tubular portion 26 having two stepped diameter portions 22 and 23 and in this case a double flange 27' in the vicinity of the inner stopper 11.

Also plotted is the retaining ring 40d with the radially inwardly protruding flange 41. The retaining ring 40d is externally threaded to screw into the hub shell 2.

In this configuration, it is preferred to provide the friction member 31 for connecting the stopper components 20d and 30d in the second diameter portion 23 having the larger outer diameter, secure against loss. In this way the available wall thickness for transmitting the clamping forces is not reduced in the diameter portion 22. Depending on the design, material thickness and material type it is also possible to arrange the groove accommodating the friction member 31 in the first diameter portion 22 as the dotted line shows.

It is also possible and preferred to arrange the friction ring 31 in the first diameter portion 32 of the second stopper component 30d as another dotted line shows. The wall in the first diameter portion 32 is thicker than in the second diameter portion 33.

The outer diameter of the outer stopper 13d with the outer stop face 14 is larger than that of the first stopper component 20d.

On the whole the invention provides an advantageous bicycle component 1 with adapter units 10 and 60 for manufacturing a two-wheeled vehicle 100 showing advantageous properties.

The enlarged diameters of the outer stoppers 13 allow to achieve a more rigid wheel accommodation wherein the bipartite configuration of the stopper only involves minor additional mounting steps and furthermore, mounting errors can be reliably avoided.

While a particular embodiment of the present bicycle component comprising an adapter unit and adapter unit has been described herein, it will be appreciated by those skilled in the art that changes and modifications may be made thereto without departing from the invention in its broader aspects and as set forth in the following claims.

| List of reference numerals: | |
|---|---|
| 1 | quick release device |
| 1 | bicycle component |
| 2 | hub shell |
| 2a | inner diameter (max.) |
| 3 | bearing device |
| 3a | outer diameter (max.) |
| 3b | inner bearing ring |
| 4 | bearing device |
| 5, 6 | end |
| 7 | brake disk accommodation |
| 7a | outer contour |
| 7b | axial region |
| 8 | fixing accommodation |
| 8a | internal thread |
| 9 | fixing ring |
| 9a | clear inner diameter |
| 9b | screw-in part |
| 9c | fixing member, flange |
| 10 | adapter unit |
| 11 | inner stopper |
| 12 | inner stop face |
| 13 | outer stopper |
| 14 | outer stop face |
| 14a | outer diameter |
| 15 | adapter ring |
| 16 | spacer |
| 17 | O-ring |
| 18 | force transfer component |
| 20 | first stopper component |
| 21 | overlapping portion |
| 22 | diameter portion |
| 23 | diameter portion |
| 25 | tubular portion |
| 26 | radial flange |
| 26a | region |
| 27 | double flange |
| 30 | second stopper component |
| 31 | friction member, O-ring |
| 32 | diameter portion |
| 33 | diameter portion |
| 34 | groove |
| 36 | radial flange |
| 40 | retaining ring |
| 41 | flange |
| 42 | fastening ring |
| 45 | rotor |
| 46 | bearing |
| 47 | freewheel |
| 48 | inner diameter |
| 50 | sealing device |
| 60 | adapter unit |
| 61 | inner stopper |
| 62 | inner stop face |
| 63 | outer stopper |
| 64 | outer stop face |
| 64a | outer diameter |
| 70 | first stopper component |
| 75 | tubular portion |
| 76 | radial flange |
| 76a | region |
| 80 | second stopper component |
| 90 | axle device |
| 91 | through axle |
| 92 | flange-type axle |
| 93 | tensioning lever |
| 94 | thread |
| 95 | axle part |
| 96 | axle stub |
| 97 | shoulder |
| 100 | two-wheeled vehicle, bicycle |
| 101 | wheel, front wheel |
| 102 | wheel, rear wheel |
| 103 | frame |
| 104 | fork |
| 105 | damper |
| 106 | handlebar |
| 107 | saddle |
| 108 | hub |
| 109 | spoke |
| 110 | rim |
| 111 | brake disk |
| 112 | drive |
| 113 | dropout |

The invention claimed is:

1. A bicycle component, comprising:
a hub shell for a wheel of an at least partially muscle-powered bicycle, the hub shell having a center and being rotatably supported by means of at least one bearing device; and
an adapter unit arranged on at least one end of the hub shell, wherein the adapter unit comprises an inner stopper having an inner stop face for transferring a clamping force to the at least one bearing device and an outer stopper with an outer stop face transmitting at least part of the clamping force, wherein at least a portion of the outer stopper radially surrounds the inner stopper, and the inner stopper and the outer stopper each have outermost ends, which are axially furthest away from the center of the hub shell, and wherein the outermost end of the outer stopper is axially further away from the center of the hub shell than the outermost end of the inner stopper, and the outer stopper has an outer diameter that is larger than an outer diameter of the inner stopper.

2. The bicycle component according to claim 1 wherein the outer diameter of the outer stopper is larger than a maximum outer diameter of the bearing device and/or a maximum inner diameter of the hub shell.

3. The bicycle component according to claim 1 wherein the inner stopper with the inner stop face is configured on a first stopper component and the outer stopper with the outer stop face is configured on a second stopper component.

4. The bicycle component according to claim 3 wherein the first stopper component is indirectly supported on the bearing device by means of a force transfer component.

5. The bicycle component according to claim 3 wherein the first stopper component rests immediately against an inner bearing ring of the bearing device.

6. The bicycle component according to claim 3 wherein the second stopper component radially surrounds the first stopper component over at least an overlapping portion.

7. The bicycle component according to claim 3 wherein at least one friction member such as an O-ring is disposed between the first and second stopper components.

8. The bicycle component according to claim 3 wherein a friction member is disposed in a groove in the second stopper component and/or wherein the friction member is disposed in a groove in the first stopper component.

9. The bicycle component according to claim 3 wherein the first stopper component comprises a tubular portion and at least one radial flange in a region at the inner stopper.

10. The bicycle component according to claim 3 wherein the first stopper component is secured on the hub shell by a separate retaining ring.

11. The bicycle component according to claim 10 wherein the retaining ring comprises at least one flange protruding radially inwardly.

12. The bicycle component according to claim 10 wherein a sealing device is provided for sealing the interior of the hub shell wherein the sealing device is formed at least in part by the retaining ring and/or the radial flange of the first stopper component.

13. The bicycle component according to claim 1 wherein a fixing accommodation with an internal thread is configured on the hub shell in an axial region of a brake disk accommodation.

14. The bicycle component according to claim 1 wherein a fixing ring is disposed on a fixing accommodation for axially fixing a brake disk.

15. The bicycle component according to claim 14 wherein the outer diameter of the outer stopper is larger than a clear inner diameter of the fixing ring.

16. The bicycle component according to claim 14 wherein the fixing ring comprises a screw-in part and at least one fixing member protruding outwardly therefrom.

17. The bicycle component according to claim 1 wherein the outer diameter of the outer stopper is at least 27 mm.

18. The bicycle component according to claim 1 comprising a through axle.

19. An adapter unit for a hub of an at least partially muscle-powered bicycle comprising:
a first stopper component having an inner stopper and an inner stop face at least partially disposed thereat, and a second stopper component having an outer stopper and an outer stop face at least partially disposed thereat; wherein the first stopper component is substantially configured tubular and comprises a flange forming the inner stopper; and wherein the second stopper component is configured tubular and comprises an outwardly protruding flange forming the outer stopper; wherein the second stopper component and the first stopper component radially surround one another in portions; wherein an outermost end of the second stopper component is positioned axially outwardly from an outermost end of the first stopper component, wherein the first stopper component and the second stopper component are held together secure against loss by means of a friction member, and wherein the outer stop face has an outer diameter that is greater than an outer diameter of the flange on the first stopper component.

20. The adapter unit according to claim 19 wherein the flange is disposed at the first stopper component adjacent to and spaced apart from the inner stopper.

21. The adapter unit according to claim 19 wherein the first stopper component comprises at least two diameter portions.

* * * * *